US012608539B2

(12) United States Patent
Peterson et al.

(10) Patent No.: US 12,608,539 B2
(45) Date of Patent: Apr. 21, 2026

(54) ARTIFICIALLY INTELLIGENT SYSTEMS, METHODS AND MEDIA FOR CANONICALIZING COMPUTER SYSTEM LOGS INTO NATURAL LANGUAGE PROCESSED REPRESENTATIONS FOR THE PURPOSE OF DATA ANALYSIS

(71) Applicant: PRE Security Inc., Salt Lake City, UT (US)

(72) Inventors: John Uliss Peterson, Morgan Hill, CA (US); Paul Soren Jespersen, Lopez Island, WA (US)

(73) Assignee: PRE Security Inc., Salt Lake City, UT (US)

( * ) Notice: Subject to any disclaimer, the term of this patent is extended or adjusted under 35 U.S.C. 154(b) by 0 days.

(21) Appl. No.: 19/216,504

(22) Filed: May 22, 2025

(65) Prior Publication Data

US 2025/0292012 A1     Sep. 18, 2025

Related U.S. Application Data

(63) Continuation of application No. 19/075,168, filed on Mar. 10, 2025.

(60) Provisional application No. 63/565,961, filed on Mar. 15, 2024.

(51) Int. Cl.
*G06F 21/57*          (2013.01)
*G06F 40/186*        (2020.01)
*G06F 40/58*          (2020.01)

(52) U.S. Cl.
CPC ............ *G06F 40/186* (2020.01); *G06F 40/58* (2020.01)

(58) Field of Classification Search
CPC ............................... G06F 40/186; G06F 40/58
See application file for complete search history.

(56) References Cited

U.S. PATENT DOCUMENTS

| | | | | |
|---|---|---|---|---|
| 11,777,970 B1* | 10/2023 | Wainer | ................... | G06N 20/00 |
| | | | | 726/23 |
| 2021/0216928 A1* | 7/2021 | O'Toole | .................. | G06F 16/29 |
| 2022/0229859 A1* | 7/2022 | O'Neill | ................... | H04L 67/12 |
| 2023/0038671 A1* | 2/2023 | Weber | .................. | H04L 51/212 |
| 2023/0086863 A1* | 3/2023 | Silberman | ............. | G06F 21/577 |
| | | | | 726/22 |

FOREIGN PATENT DOCUMENTS

| | | | | | |
|---|---|---|---|---|---|
| CN | 115329082 | A | * 11/2022 | ............. | G06F 40/30 |
| CN | 117973347 | A | * 5/2024 | ............. | G06F 18/15 |

* cited by examiner

*Primary Examiner* — Hassan Mrabi
(74) *Attorney, Agent, or Firm* — Carr & Ferrell LLP; Sean M. Cody; K. Brian Bathurst

(57) ABSTRACT
Provided herein is an exemplary system for canonicalizing computer system logs into natural language processed representations for data analysis, the system including a real-time data collector, a cyber security purpose-based large language model communicatively coupled to the real-time data collector, a multi-dimensional vector generator communicatively coupled to the cyber security purpose-based large language model and a vectorization index and a prediction engine communicatively coupled to the multi-dimensional vector generator.

20 Claims, 5 Drawing Sheets

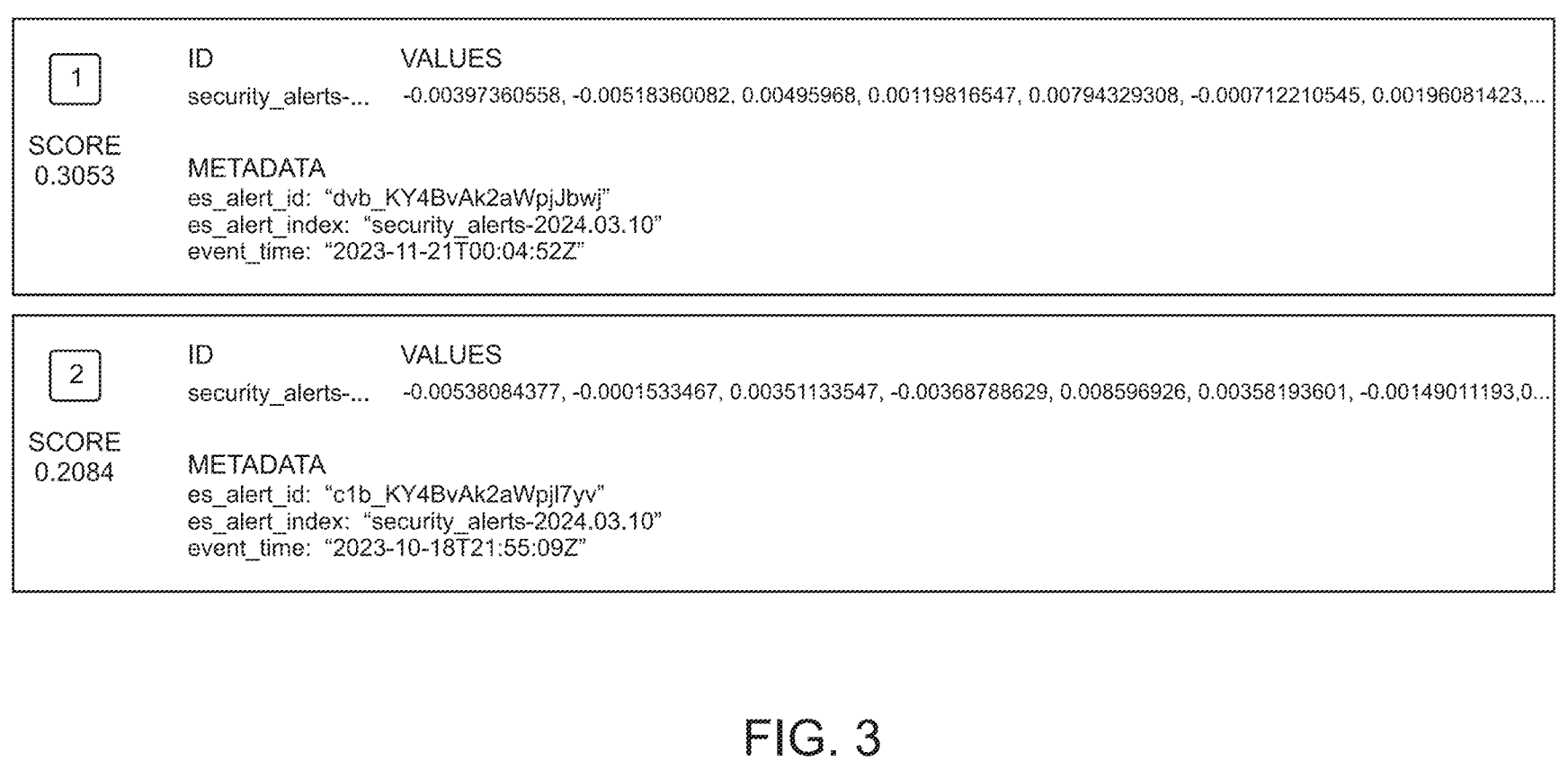

1

ID          VALUES
security_alerts-...    -0.003973360558, -0.00518360082, 0.00495968, 0.00119816547, 0.00794329308, -0.0007122105545, 0.00196081423,...

METADATA
es_alert_id: "dvb_KY4BvAk2aWpjJbwj"
es_alert_index: "security_alerts-2024.03.10"
event_time: "2023-11-21T00:04:52Z"

SCORE
0.3053

2

ID          VALUES
security_alerts-...    -0.0053808437, -0.00001533467, 0.00351133547, -0.00368788629, 0.008596926, 0.00358193601, -0.00149011193,0...

METADATA
es_alert_id: "c1b_KY4BvAk2aWpjl7yv"
es_alert_index: "security_alerts-2024.03.10"
event_time: "2023-10-18T21:55:09Z"

SCORE
0.2084

FIG. 3

ARTIFICIALLY INTELLIGENT SYSTEMS, METHODS AND MEDIA FOR CANONICALIZING COMPUTER SYSTEM LOGS INTO NATURAL LANGUAGE PROCESSED REPRESENTATIONS FOR THE PURPOSE OF DATA ANALYSIS

CROSS REFERENCE TO RELATED APPLICATIONS

This continuation application claims the priority benefit of U.S. Non-Provisional patent application Ser. No. 19/075,168 filed on Mar. 10, 2025 and titled, "Systems, Methods and Media for Canonicalizing Computer System Logs into Natural Language Processed Representations for the Purpose of Data Analysis," which in turn claims the priority benefit of U.S. Provisional Patent Application Ser. No. 63/565,961 filed on Mar. 15, 2024 and titled, "Systems and Methods for Canonicalizing Computer System Logs into Natural Language Processed Representations for the Purpose of Data Analysis," which are all hereby incorporated by reference in their entireties.

TECHNICAL FIELD

The field of the exemplary embodiments described herein pertain to the canonicalization of computer system logs into natural language processed representations.

Canonicalizing refers to the process of standardizing or normalizing data or representations in a consistent manner. In various contexts such as computer science, mathematics, and linguistics, canonicalization ensures that different forms or representations of the same concept are transformed into a single, agreed-upon form. This helps in simplifying comparisons, reducing redundancy, and ensuring interoperability across systems or platforms.

For example, in computing, canonicalization often refers to converting different representations of data (such as file paths, URLs, or data formats) into a standard or canonical form to prevent ambiguities and security vulnerabilities. In linguistics, canonicalization might involve standardizing the spelling or grammatical structure of words or phrases.

Overall, canonicalization is about establishing a standard or canonical representation for data or concepts to facilitate consistency and interoperability. According to the exemplary embodiments described herein, it is a pioneering area that merges the domains of computer science, artificial intelligence, and linguistics. It focuses on developing innovative methods and systems that transform the inherently complex and technical data found in computer logs into a format that is easily understandable by humans. This field seeks to bridge the gap between the detailed, data-rich environment of computer systems and the intuitive, analytical capabilities of human operators. By doing so, it enables more efficient monitoring, troubleshooting, and optimization of computer systems, making this field an essential contributor to enhancing the accessibility and usability of digital information in an increasingly technology-driven world.

SUMMARY OF EXEMPLARY EMBODIMENTS

Exemplary embodiments provided herein include methods for canonicalizing computer system logs into natural language processed representations for data analysis, the method including receiving a log file, transmitting the log file to a cyber security purpose-based large language model, applying natural language processing by the large language model to the log file, generating a plain English translation of the log file by the large language model, canonicalizing the plain English translation of the log file by the large language model, generating a multi-dimensional vector from the plain English translation of the log file by the large language model, applying a cosine similarity calculation to the multi-dimensional vector, generating a multi-dimensional natural language alert signature from the multi-dimensional vector, storing the multi-dimensional natural language alert signature in a vector index data base, applying a machine learning algorithm to the multi-dimensional natural language alert signature in the vector index data base, associating the multi-dimensional natural language alert signature with the log file, finger-printing the multi-dimensional natural language alert signature with the log to generate a finger print, associating the multi-dimensional natural language alert signature with the plain English translation and matching the finger print to another log file.

Exemplary methods also include originating the received log file from a variegated assortment of tools, preserving the received log file by storing it within a database, ensuring its availability for future reference, treating the received log file as a contiguous string of text, subjecting the contiguous string of text to an embedding model, tokenizing the contiguous string of text, vectorizing the contiguous string of text into vector form, including a prompt with the transmitting of the log file to a cyber security purpose-based large language model, and designing the prompt to guide the large language model in its interaction with the log file.

According to various exemplary embodiments, methods include designing the prompt as a template, and designing the prompt as the template reading, "TEMPLATE: 'Please summarize this data, using a template like this: 'The tool, TOOLNAME, with event id EVENTID, detected an event named EVENTNAME. This event was detected on DATE. The source IP address was SOURCEIP and the source TCP port was SOURCEPORT. The destination IP address was DESTINATIONIP and the destination TCP port was TCP-PORT. The protocol used was PROTOCOL. The source IP address is located in S-CITY, S-COUNTRY, and the destination IP address is located in D-CITY, D-COUNTRY. Replace the capitalized variables with their respective information. Replace EVENTID with its respective information. Replace S-CITY, S-COUNTRY, D-CITY, D-COUNTRY with their respective information. Always respond with the event creation date, in a format like: Aug. 6, 2023 at 23:24:48. Remove all underscores from event names if they exist," responding by the cyber security purpose-based large language model with information including an identity of a tool, event id, detected event, time of detection, a source IP address, a destination TCP port, a protocol used, a geographic location of the source IP address and a geographic location of a destination IP address.

Also provided herein is an exemplary system for canonicalizing computer system logs into natural language processed representations for data analysis, the system including a real-time data collector, a cyber security purpose-based large language model communicatively coupled to the real-time data collector, a multi-dimensional vector generator communicatively coupled to the cyber security purpose-based large language model and a vectorization index and a prediction engine communicatively coupled to the multi-dimensional vector generator. In further exemplary systems the real-time data collector is configured to receive a log file from a variegated assortment of tools, the cyber security purpose-based large language model is configured to receive the log file, the cyber security purpose-based large language model is configured to apply natural language processing by the large language model to the log file, the cyber security purpose-based large language model is configured to generate a plain English translation of the log file, the cyber security purpose-based large language model is configured to canonicalize the plain English translation of the log file, the cyber security purpose-based large language model is configured to generate a multi-dimensional vector from the plain English translation of the log file and the vectorization index is configured to receive the multi-dimensional vector.

BRIEF DESCRIPTION OF THE FIGURES

Certain embodiments of the present technology are illustrated by the accompanying figures. It will be understood that the technology is not necessarily limited to the particular embodiments illustrated herein.

FIG. 3 is an example of what the resulting log might look like after stored in a vectorization database, with its vectors and associated metadata and pointers to the original unmodified log.

DETAILED DESCRIPTION

Figure 1:
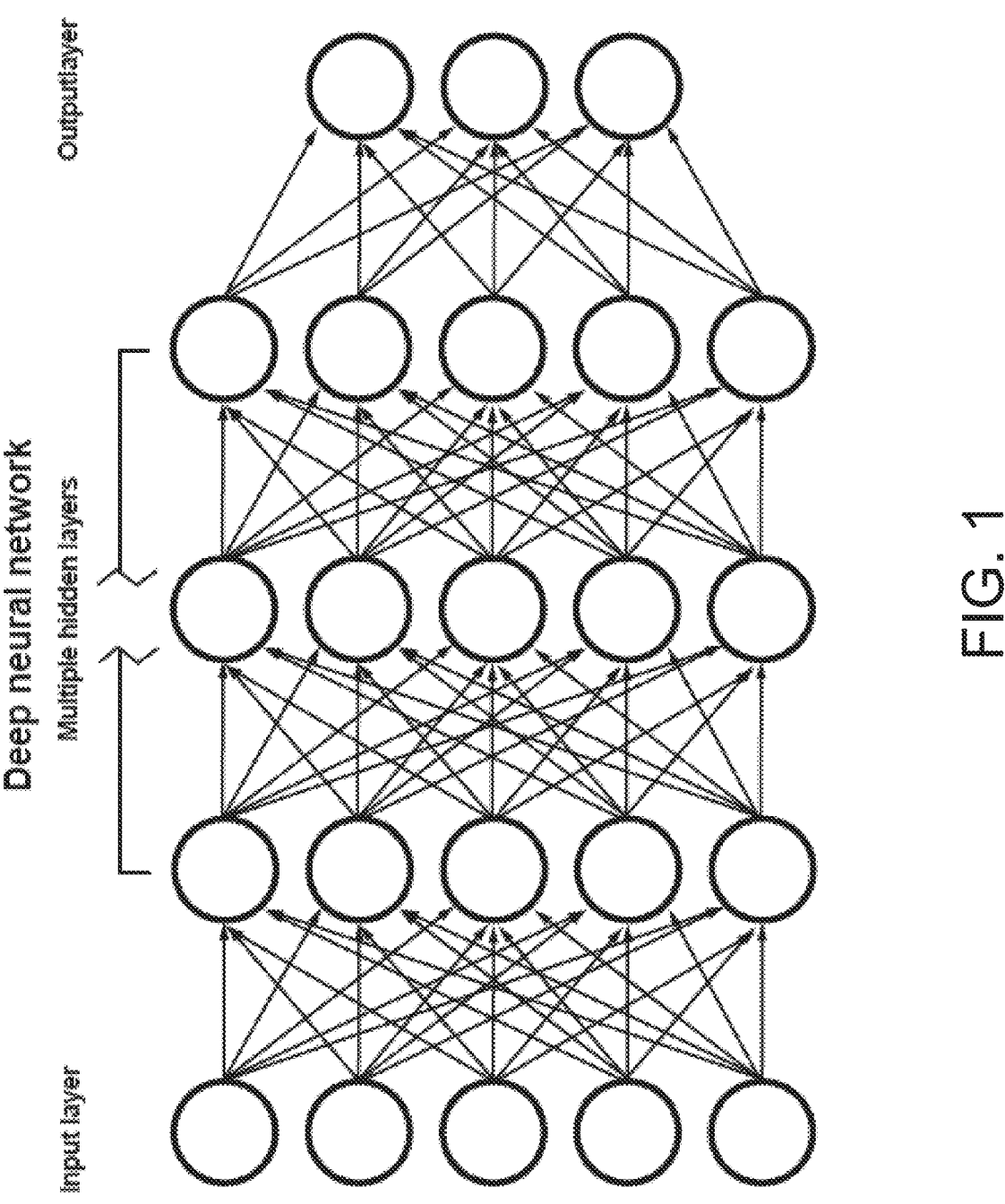
FIG. 1 shows an exemplary deep neural network.

In today's digital world, computer systems are integral to almost every aspect of business, government, and personal activities. These systems generate vast amounts of log data that capture everything from user interactions to system errors and security incidents. However, these logs are often in formats that are difficult for humans to interpret, filled with technical jargon, codes, and sequences that can be daunting even for experienced IT professionals. This complexity can slow down the process of diagnosing issues, understanding user behavior, and identifying security threats. By converting these logs into natural language, or a more human-readable format, stakeholders can more quickly and accurately analyze data, make informed decisions, and respond to issues. This process can enhance system reliability, improve user experience, and bolster security measures, making it a critical advancement in the management and optimization of computer systems.

In the realm of computer systems, a diverse array of tools are employed to generate logs pertaining to various aspects such as cyber security incidents, device activities, network operations, and application functions. The heterogeneous nature of these logs, emanating from disparate sources and tools, each with its unique format and semantics, presents a significant challenge for systems reliant on log data for operational and analytical purposes. Traditionally, the assimilation of this multifaceted log data necessitated the development of specialized parsers, tailored to interpret the distinct data formats provided by each tool. This requirement for bespoke parsers, potentially numbering in the hundreds to accommodate the variety of vendor-specific tools, introduces a scalability issue, compounding the complexity of log data integration. The exemplary embodiments described herein aim to mitigate this challenge by harnessing natural language processing (NLP) technologies. This approach seeks to standardize the disparate log data into a unified format, modeled on human language, thereby streamlining the ingestion process and enhancing the interoperability of log data across a multitude of system environments.

The exemplary embodiments described herein are designed to take computer system logs (which are records of events or actions that have taken place within a computer system) and convert them into a format that is easier for humans to understand. This conversion uses natural language processing (NLP), which is a type of artificial intelligence that helps computers understand human language. The goal is to transform the raw data from the logs into a form that is more suitable for analyzing and making sense of the information contained within those logs. In simpler terms, it is about turning complex computer log data into a format that looks more like everyday human language, making it easier to figure out what's happening or has happened in the computer system.

While the transformation of log data into natural language representations marks a significant advancement, it alone may not suffice for the nuanced requirements of analytical systems, particularly within the domain of cyber security, where prediction, detection, and prevention are paramount. To render the natural language processed data amenable to computational analysis, an additional layer of conversion is imperative, whereby this data is translated into numerical values. As described herein are sophisticated methodologies for this subsequent transformation, utilizing the concept of embeddings to map natural language into a multi-dimensional vector space. Such embeddings, which may include word, paragraph, or node-based variants, facilitate the conversion of textual data into a format inherently more suited to computational processes.

According to most exemplary embodiments, a multi-dimensional vector is a mathematical concept used to represent points in a space with more than two dimensions. While visualizing points on a two-dimensional plane (x and y axes), a multi-dimensional vector represents points in spaces with three, four, or even hundreds of dimensions. Each dimension in a multi-dimensional vector represents a specific value or attribute. Additionally, each dimension in the vector is called a "component." These components hold the specific values for that particular dimension. In data analysis and machine learning, high-dimensional vectors are used to represent data points with various features.

This dual-stage conversion process, from raw logs to natural language and subsequently into numerical vectors, significantly enhances the data's utility for complex analytical tasks, thereby extending the applicability and efficacy in contexts requiring advanced data interpretation and analysis capabilities.

The exemplary embodiments described herein furnish a versatile mechanism capable of conducting data analytical operations across heterogeneous datasets, obviating the necessity for specialized tool-specific integrations for data conversion and processing. While the exposition herein predominantly addresses applications within the cyber security analytics sphere, it is imperative to underscore that the technology's utility transcends this particular domain, offering broad applicability across an array of technological fields.

FIG. 1 shows an exemplary deep neural network.

As a preliminary matter, artificial intelligence ("AI") may include large language models ("LLMs") and neural networks, also known as artificial neural networks (ANNs) or simulated neural networks (SNNs), that are a subset of machine learning and are at the heart of deep learning algorithms. The neural network's name and structure are inspired by the human brain, mimicking the way that biological neurons signal to one another. Artificial neural networks (ANNs) are comprised of node layers, comprising an input layer, one or more hidden layers, and an output layer. Each node, or artificial neuron, connects to another and has an associated weight and threshold. If the output of any individual node is above the specified threshold value, that node is activated, sending data to the next layer of the network. Otherwise, no data is passed along to the next layer of the network.

Neural networks rely on training data to learn and improve their accuracy over time. However, once these learning algorithms are fine-tuned for accuracy, they are powerful tools in computer science and artificial intelligence, allowing one to classify and cluster data at a high velocity. Tasks in speech recognition or image recognition can take minutes versus hours when compared to the manual identification by human experts.

In some exemplary embodiments, one should view each individual node as its own linear regression model, composed of input data, weights, a bias (or threshold), and an output. Once an input layer is determined, weights are assigned. These weights help determine the importance of any given variable, with larger ones contributing more significantly to the output compared to other inputs. All inputs are then multiplied by their respective weights and then summed. Afterward, the output is passed through an activation function, which determines the output. If that output exceeds a given threshold, it "fires" (or activates) the node, passing data to the next layer in the network. This results in the output of one node becoming the input of the next node. This process of passing data from one layer to the next layer defines this neural network as a feedforward network. Larger weights signify that particular variables are of greater importance to the decision or outcome.

According to some exemplary embodiments, deep neural networks are feedforward, meaning they flow in one direction only, from input to output. However, one can also train a model through backpropagation; that is, move in the opposite direction from output to input. Backpropagation allows one to calculate and attribute the error associated with each neuron, allowing one to adjust and fit the parameters of the model(s) appropriately.

In machine learning, backpropagation is an algorithm for training feedforward neural networks. Generalizations of backpropagation exist for other artificial neural networks (ANNs), and for functions generally. These classes of algorithms are all referred to generically as "backpropagation". In fitting a neural network, backpropagation computes the gradient of the loss function with respect to the weights of the network for a single input-output example, and does so efficiently, unlike a naive direct computation of the gradient with respect to each weight individually. This efficiency makes it feasible to use gradient methods for training multilayer networks, updating weights to minimize loss; gradient descent, or variants such as stochastic gradient descent, are used. The backpropagation algorithm works by computing the gradient of the loss function with respect to each weight by the chain rule, computing the gradient one layer at a time, iterating backward from the last layer to avoid redundant calculations of intermediate terms in the chain rule; this is an example of dynamic programming. The term backpropagation strictly refers only to the algorithm for computing the gradient, not how the gradient is used; however, the term is often used loosely to refer to the entire learning algorithm, including how the gradient is used, such as by stochastic gradient descent. Backpropagation generalizes the gradient computation in the delta rule, which is the single-layer version of backpropagation, and is in turn generalized by automatic differentiation, where backpropagation is a special case of reverse accumulation (or "reverse mode").

With respect to FIG. 1, according to some exemplary embodiments, the system produces an output, which in turn produces an outcome, which in turn produces an input. In some embodiments, the output may become the input.

Figure 2:
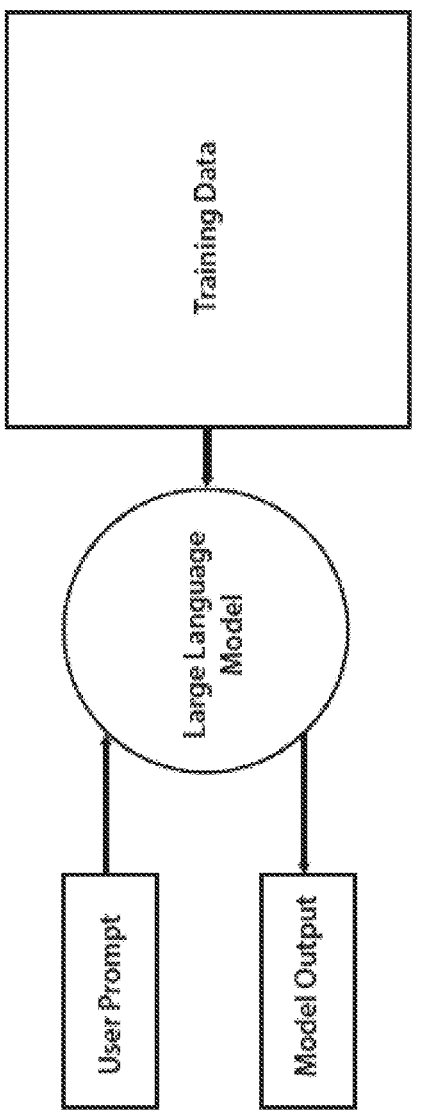
FIG. 2 shows an exemplary large language model.

FIG. 2 shows an exemplary large language model.

Shown in FIG. 2 is a user prompt, a large language model, training data, and a model output. A user prompt in an LLM is a piece of text that is used to guide the LLM to generate a desired model output. The prompt can be used to specify the type of model output that the LLM should generate, as well as the style and tone of the output. The quality of the model output generated by an LLM is heavily influenced by the quality of the prompt. A well-crafted prompt will help the LLM to generate output that is more relevant, accurate, and creative.

A large language model (LLM) is a type of artificial intelligence (AI) model that is trained on a massive amount of text data. This data can be text from books, articles, websites, or any other source of text. The LLM learns the patterns and structure of the text data, and it can then use this knowledge to generate new text, translate languages, write different kinds of creative content, and answer questions in an informative way.

Transformer architecture is the backbone of the transformer models like GPT and many other prominent LLMs. The transformer architecture is a neural network architecture that allows for parallel processing and is used by large language models to process data and generate contextually relevant responses. It consists of a series of layers, with each layer consisting of parallel processing components called attention mechanisms and feedforward networks. The attention mechanisms weigh the importance of each word, using statistical models to learn the relationships between words and their meanings. This allows LLMs to process sequences in parallel and generate contextually relevant responses.

When comparing the performance and capabilities of LLMs, it is important to note that each model has been trained for a very specific purpose, and the best model will depend on the specific Natural Language Processing ("NLP") task at hand. According to the exemplary embodiments described herein, training includes massive amounts of information based on cyber security, including the cyber security manuals, protocols, etc. offered by numerous cyber security companies. The result: the creation of a cyber security training set.

Large language models can process and understand human language at scale. These models use deep learning techniques to analyze vast amounts of text data, making them highly proficient in language processing tasks such as text generation, summarization, translation, and sentiment analysis. They can also be used in language translation software to accurately translate text from one language to another, making communication and understanding between people who speak different languages much easier. They can also write, optimize or help fix code.

LLMs and neural networks can be combined to work together. In some exemplary embodiments, this may be done by using the LLM to generate a set of features that are then fed into the neural network. The neural network can then use these features to make predictions or classifications. For example, in natural language processing, LLMs can be used to generate text features that are then fed into neural networks for tasks such as sentiment analysis, machine translation, and question answering.

The training of AI includes:

Supervised learning: In supervised learning, the AI is trained on a set of labeled data.

Unsupervised learning: In unsupervised learning, the AI is trained on a set of unlabeled data.

Reinforcement learning: In reinforcement learning, the AI is rewarded for identifying an item correctly. Over time, the AI consistently improves.

The specific approach that is used will depend on the specific needs of the application. For example, if the goal is to identify changes as soon as possible, then supervised learning may be a good option. However, if the goal is to understand the nuances of an item, then unsupervised learning or reinforcement learning may be a better option.

In addition to the type of learning, the training of AI also depends on the size and quality of the data set. A larger data set will typically lead to better performance, but it may also take longer to train the AI. The quality of the data set is also important, as it should be representative of the types of documents and/or data that the AI will be used to analyze.

Most deep neural networks are feedforward, meaning they flow in one direction only, from input to output. However, one can also train a model through backpropagation; that is, move in the opposite direction from output to input. Backpropagation allows one to calculate and attribute the error associated with each neuron, allowing one to adjust and fit the parameters of the model(s) appropriately.

Like with using AI for facial recognition, there can be a huge variability in the data that is being processed and a limited amount of data for training the AI. Accordingly, according to various exemplary embodiments, the training set can be expanded by applying mathematical transformation functions on an acquired set of data. For example (and not by limitation), the AI can determine a statistical standard deviation within a particular data set and apply increasing or decreasing increments of the standard deviation to the data set. The AI can be trained with this expanded training set using stochastic learning with backpropagation which is a type of machine learning algorithm that uses the gradient of a mathematical loss function to adjust the weights of an AI network. Unfortunately, the introduction of an expanded training set tends to increase false positives when classifying data. Accordingly, the second feature is the minimization of these false positives by performing an iterative training algorithm, in which the AI network is retrained with an updated training set including the false positives. This combination of features provides a robust AI network.

In the specific context of cyber security, exemplary embodiments adeptly accommodate logs originating from a myriad of sources, including but not limited to firewalls, endpoint detection and response systems, cloud security platforms, security information and event management systems, and intrusion detection frameworks. They are adept at handling the intrinsic diversity not only of the data sources but also of the content encapsulated within these logs. This content encompasses a wide range of data points such as user identities, packet counts, protocol specifications, process information, malware detection data, geographical location details, and access timestamps, among others. To facilitate advanced analytical operations, including but not limited to machine learning and artificial intelligence applications, exemplary embodiments incorporate a comprehensive process for the canonicalization of datasets. This process involves the meticulous tokenization and subsequent vectorization of each constituent element within the datasets, thereby rendering the data optimally structured for intricate computational analysis as delineated herein.

Various exemplary embodiments are architected to adeptly manage the ingestion of log data originating from a variegated assortment of tools, each characterized by distinct content types embedded within the logs. Upon acquisition, the technologies described herein meticulously preserve the integrity of the original, unaltered log by storing it within a database, ensuring its availability for subsequent reference. Subsequent to this preservation step, the system embarks on the process of canonicalization.

In this canonicalization phase, the entirety of the log is processed, treating it as a contiguous string of text, which is then subjected to an embedding model. This model plays a pivotal role in the tokenization of the text, a precursor to its conversion into vector form through a process known as vectorization. Upon successful completion of vectorization, the resultant vectorized representation of the log is relayed upstream to a sophisticated large language model. This transfer is facilitated by the inclusion of a meticulously crafted prompt, designed to guide the large language model in its interaction with the log data.

An illustrative example of such a prompt is as follows:

"TEMPLATE: 'Please summarize this data, using a template like this: 'The tool, TOOLNAME, with event id EVENTID, detected an event named EVENTNAME. This event was detected on DATE. The source IP address was SOURCEIP and the source TCP port was SOURCEPORT. The destination IP address was DESTINATIONIP and the destination TCP port was TCPPORT. The protocol used was PROTOCOL. The source IP address is located in S-CITY, S-COUNTRY, and the destination IP address is located in D-CITY, D-COUNTRY. Replace the capitalized variables with their respective information. Replace EVENTID with its respective information. Replace S-CITY, S-COUNTRY, D-CITY, D-COUNTRY with their respective information. Always respond with the event creation date, in a format like: Aug. 6, 2023 at 23:24:48. Remove all underscores from event names if they exist.'"

This template serves as a structured guideline, enabling the large language model to generate summaries of the log data in a standardized format, thereby facilitating enhanced interpretability and subsequent analytical processes.

Upon the submission of the log data along with the associated prompt to the large language model, the model endeavors to generate a canonicalized depiction of the log. This process is adeptly executed irrespective of the diversity in tool vendors or the inherent content of the logs, thereby eliminating the prerequisite of constructing bespoke parsers for each unique vendor log format. The model's response to the prompt manifests in a standardized format, exemplified by the following responses:

EXAMPLE RESPONSE 1: "The tool, CrowdStrike, with event id b8a8913, detected an event named anomalous login time. This event was detected on Nov. 17, 2023 at 14:51:13. The source IP address was 132.172.102.37 and the source TCP port was 45240. The destination IP address was 168.64.204.152 and the destination TCP port was 63403. The protocol used was TCP. The source IP address is located in the United States and the destination IP address is located in the United States."

EXAMPLE RESPONSE 2: "The tool, Fortinet, with event id 1e68b3f, detected an event named port scan. This event was detected on Aug. 8, 2023 at 06:54:33. The source IP address was 132.172.102.37 and the source TCP port was 40203. The destination IP address was 221.132.245.212 and the destination TCP port was 28734. The protocol used was TCP. The source IP address is located in the United States and the destination IP address is located in Indonesia."

Subsequent to the generation of these responses, exemplary embodiments diligently archive them within a database, thus setting the stage for the ensuing phase of data preprocessing. This phase involves the meticulous removal of log-specific variable content, such as IP addresses, geographical locations, ports, and protocols, thereby distilling the data into a quintessential "log or alert" signature. This signature serves as the foundation for the subsequent vectorization stage.

The vectorization of the "log or alert" signature is undertaken with a degree of flexibility, employing a variety of embedding models to cater to diverse analytical use cases. Various exemplary embodiments may opt for a paragraph embedding model to encapsulate the log in an optimally efficient numerical representation, or alternatively, it may leverage word or node embedding models, depending on the specific requirements of the analysis at hand. This multifaceted approach to vectorization underscores the capacity to adaptively transform and prepare the canonicalized log data for a broad spectrum of computational analytics.

Upon finalizing the vectorization process, various exemplary embodiments methodically store the resulting vectors and relevant metadata from the original logs, which were previously secured in a database and a pointer to the original log within the database, as depicted in FIG. 3. This deliberate retention of variable information, removed during the canonicalization stage, ensures its continued association with the newly developed "multi-dimensional log signature." This integrated dataset, comprising both vectors and metadata, is then housed within a specialized vectorization database renowned for its exceptional efficiency and rapid retrieval capabilities. This arrangement enables the future querying and retrieval of logs with heightened efficiency and precision, highlighting the proficiency in organizing and maintaining complex data structures for advanced analytical applications.

The methods of log canonicalization as disclosed herein presents a plethora of practical applications across various analytical domains. The vectorized data, derived from this innovative process, serves as a robust foundation for advanced analytical methodologies, including but not limited to machine learning algorithms and log event forecasting. A notable advantage of this method is its capacity to substantially condense log information, thereby achieving a reduction in storage requirements and facilitating an extension in log retention durations. Furthermore, these techniques enable the identification and correlation of log entries that bear similarities, irrespective of the originating tool vendor. This attribute significantly enhances the versatility and applicability of the methods, making it a valuable asset in the realm of data analysis and management.

FIG. 3 illustrates a depiction of a log's storage within a vector index, encompassing both the vectors, which constitute the numerical representation derived from the natural language processing of the original log and the pertinent metadata. Additionally, this index includes references to the original log and its natural language processed counterpart, ensuring comprehensive traceability and accessibility of the log data at various stages of transformation. This structured approach to log storage within a vector index exemplifies the capability to efficiently organize and manage complex data sets, facilitating seamless integration and retrieval of log information for analytical purposes.

In FIG. 3, the values are dimensions. The metadata points back to the originally received log and the natural language translation. The es_alert_id is the raw log that originated from a particular cyber security vendor. It points back to the plain English translation and the original raw log. The es_alert_index is where the log is stored. The event_time is the time the log was received.

The score represents the proximity of number 1 to number 2. In this particular example, the score of number 1 is 0.3053. The score of number 2 is 0.2084. If, for example, the first score was 0.30 and the second score was 0.29 they would be very close in proximity, which would likely mean that they are probably the same alert with a little variant to it because they came from different vendors.

The scores are calculated using cosine similarity. Cosine similarity is a metric used to measure how similar two vectors are, specifically in the direction or orientation of those vectors. It does not consider the magnitude or length of the vectors themselves. For example, imagine two vectors, A and B, existing in a multi-dimensional space. Cosine similarity calculates the cosine of the angle between these two vectors. The formula for cosine similarity is:

$$\text{cosine similarity}(A, B) = \cos(\theta) = (A \cdot B)/\|A\|\|B\|$$

A·B: This represents the dot product of vectors A and B. The dot product essentially multiplies corresponding components from each vector and sums the products.

$\|A\|$ and $\|B\|$: These represent the magnitudes (lengths) of vectors A and B, respectively.

Interpretation of the Result:

1: A cosine similarity of 1 indicates the two vectors are identical in direction (pointing exactly in the same direction).

0: A value of 0 means the vectors are orthogonal (perpendicular) to each other.

Values between 0 and 1: The closer the value is to 1, the more similar the direction of the vectors. Values closer to 0 indicate less similarity.

Negative values: Negative cosine similarity results occur when the vectors point in opposite directions.

Figure 4:
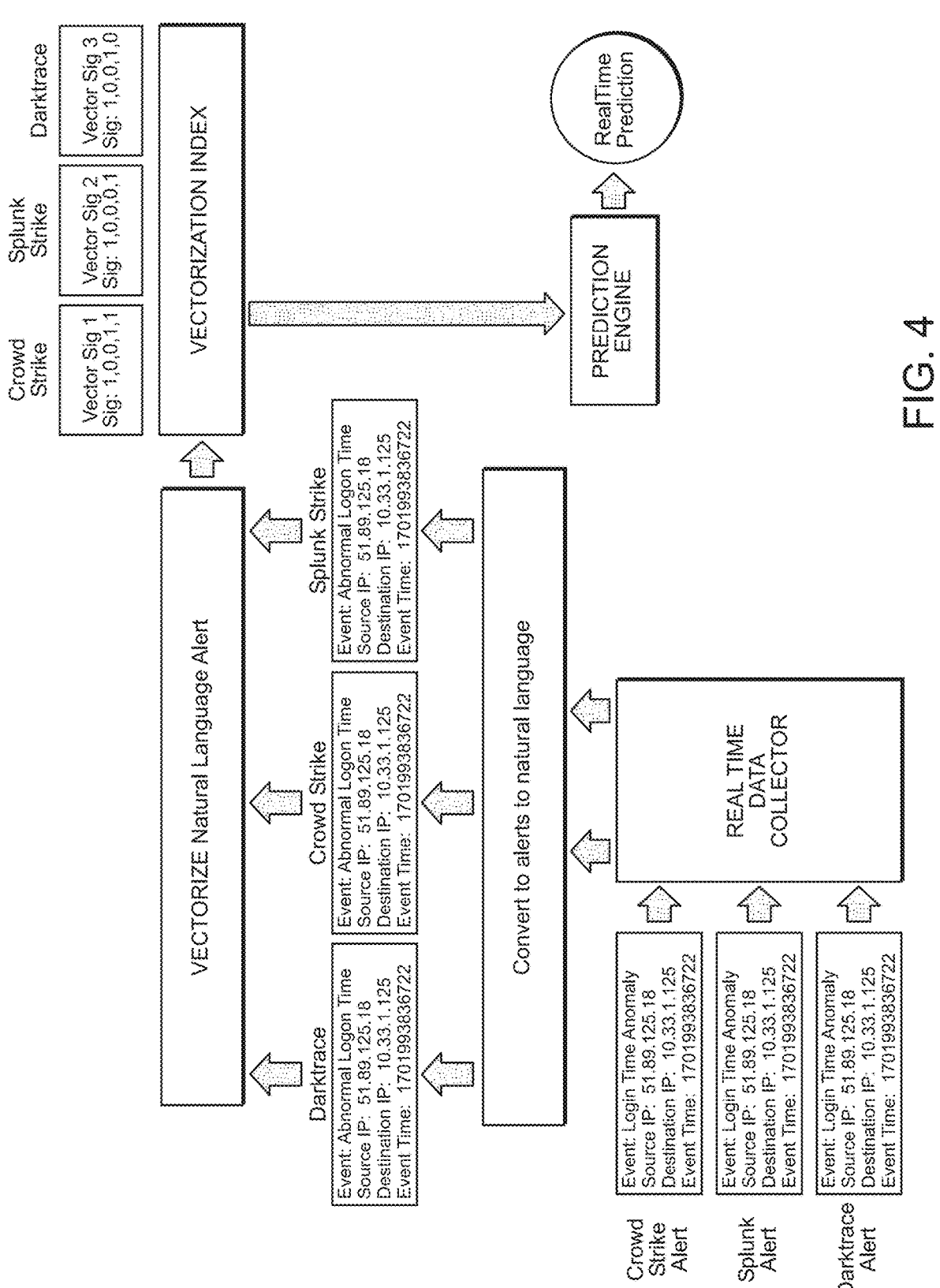
FIG. 4 is a system diagram of a log from a diverse set of tool vendors with a diverse set of content, all meaning the same thing but in a different log format from each other.

FIG. 4 provides a detailed schematic representation delineating the transformative journey of logs from their inception in original formats, sourced from diverse tool providers, through to their ultimate vectorized state. This depiction encompasses the processing of three distinct logs, each originating from separate tool providers and containing varied content. The initial phase involves the aggregation of these logs, which are subsequently subjected to conversion into natural language formats. This conversion is facilitated by the application of a Large Language Model (LLM), guided by specific prompts designed to instruct the LLM on the desired formatting of the logs.

Following the natural language processing stage, the logs undergo a vectorization process. Within this phase, an embedding model is employed to transmute the natural language representations of the logs into numerical vectors, encapsulating the essence of the log data in a series of numbers. These vectorized representations are then transferred to a vectorization index, where they are systematically stored.

With the data securely indexed, the exemplary embodiments described herein are primed for additional analytical processing. Techniques such as machine learning can be applied to the indexed data, enabling various exemplary embodiments to cater to a wide array of use cases. Although a variety of machine learning algorithms may be utilized, in some exemplary embodiments, Generative Artificial Intelligence (Gen AI) models of intelligently predicting security events for preemptive cyber defense mechanisms are employed. According to various embodiments, within the scope of the predictive analytics capabilities of the present technology, embodiments employ the Gen AI models, though the present technology is not restricted to employing the Gen AI models. The Gen AI models are a type of recurrent neural network (RNN) particularly adept at learning from sequences of data, making it ideal for time-series analysis such as that required for predicting cyber security events. Unlike standard feedforward neural networks, Gen AI models include feedback connections that allow it to process not just single data points, but entire sequences of data. This architecture enables the Gen AI models to retain information over longer periods, which is instrumental in recognizing patterns in complex and time-dependent datasets.

In some embodiments, the Gen AI models' output in the context of present technology is a predictive indication of the next likely event or events to occur, categorized into the predefined buckets. Accompanying each prediction is a probability score, reflecting the Gen AI models' confidence in the prediction's accuracy. When the system generates multiple potential outcomes, these are ranked in descending order of their probability scores, thus prioritizing predictions based on their likelihood. This ranking provides an intuitive and actionable forecast, empowering security analysts to focus on the most probable threats as identified by the robust analysis of the Gen AI models.

In some embodiments, the detailed Gen AI models' application to operation of the present provides a reliable method for anticipating cyber threats with high accuracy and facilitating proactive security measures.

This comprehensive process, from initial log collection to advanced analytical application, underscores various exemplary embodiments versatility and efficiency in harnessing the potential of log data across diverse analytical domains.

Referring again to FIG. 4, exemplary embodiments convert various logs from different tools to common natural language signatures.

Example: 1 security tool "A" calls it "Login Time Anomaly."

Example 2: Security tool "B" calls it "Login Anomaly." Common NLP Signature="Abnormal Logon Time."

Predictions are done off of a common set of signatures.

Why have Alert signatures? To look for similar alerts, even if the alert content is different.

Aggregate similar alerts to make predictions on the same or similar things occurring again. Also aggregate alerts into categories to predict the next category of alerts occurring.

Why is it considered a multi-dimensional alert signature? Because each alert has a multitude of pieces of content, that is vectorized by a multi-dimensional embedding model. One page of text can be turned into a multi-dimensional embedding, which is effectively a signature for some security alert.

Figure 5:
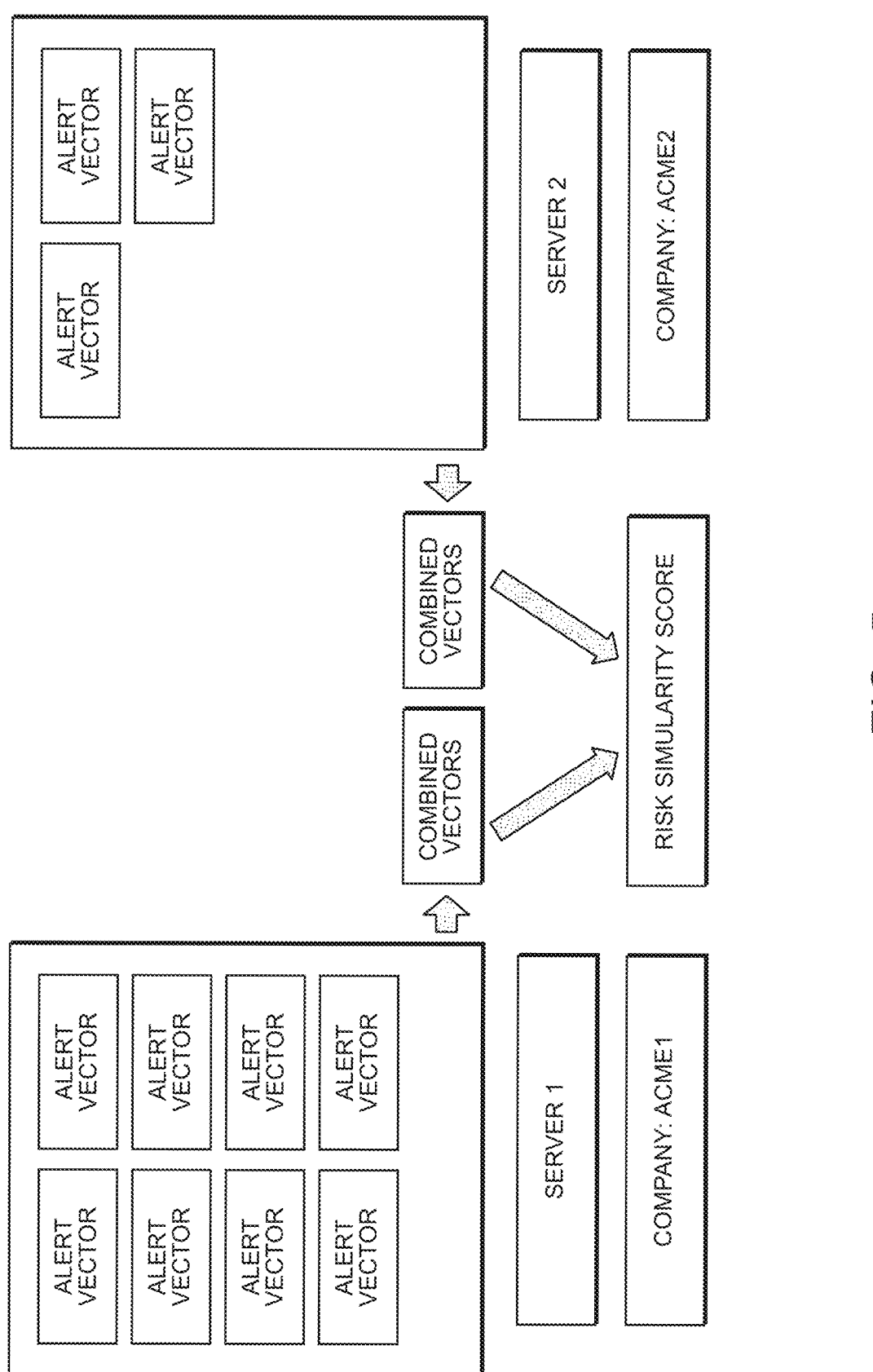
FIG. 5 is a diagram of a use case for canonicalization of log data using natural language processing to depict the use case of comparing a computer server's logs against another for the purpose of identifying risk similarities.

FIG. 5 exemplifies a practical application scenario for the multi-dimensional natural language alert signatures generated through the described processes. It illustrates a scenario wherein two servers (each associated with a different entity, e.g., company) transmit their security event logs to the systems as described herein, each yielding a collection of distinct "alert signatures." These signatures serve as a foundational element for conducting comparative analyses between the servers, particularly in the context of their respective security postures.

The figure specifically highlights the methodology by which a security analyst can leverage these alert signatures to conduct a comparative evaluation of the security configurations and vulnerabilities of one server relative to another. This comparison facilitates the swift identification and assessment of potential problem areas, discrepancies, or points of concern in the security frameworks of the servers under scrutiny. Such an application of the multi-dimensional natural language alert signatures not only underscores the versatility of the processes but also its profound utility in enhancing the efficiency and effectiveness of security analysis and management.

Some embodiments may include: a processor or multiple processors (e.g., a central processing unit (CPU), a graphics processing unit (GPU), and/or a quantum computing processer), a main memory and/or a static memory, a bus, a video display unit (e.g., a liquid-crystal display (LCD), organic light emitting diode (OLED) display, and/or a cathode ray tube (CRT)), an input device (e.g., a keyboard and/or a microphone), a cursor control device (e.g., a mouse), a digital camera, a video camera, a speaker, and/or a network (e.g., Internet, local intranet, Personal Area Network (PAN), Local Area Network (LAN), Wide Area Network (WAN), Metropolitan Area Network (MAN), and/or a virtual private network (VPN)).

The invention claimed is:

1. A method for canonicalizing computer system logs into natural language processed representations for data analysis to solve a technical problem of requiring specialized parsers for heterogeneous log formats from different cybersecurity tools, the method comprising:

receiving a log file wherein the log file is received from tools having different proprietary log formats that would otherwise require specialized parsers for interpretation from cybersecurity tools including firewalls, endpoint detection and response systems, cloud security platforms, security information and event management systems, and intrusion detection frameworks;

transmitting the log file to a cyber security purpose-based large language model;

applying natural language processing by the cyber security purpose-based large language model to the log file to overcome a heterogeneous nature of the computer system logs emanating from disparate sources and tools, each with unique format and semantics;

generating a plain English translation of the log file by the cyber security purpose-based large language model that obviates a necessity for specialized tool-specific integrations for data conversion and processing, wherein the cyber security purpose-based large language model generates a standardized format response wherein the standardized format response eliminates a need for tool-specific parsers by providing a unified representation regardless of originating vendor proprietary formats irrespective of diversity in tool vendors or inherent content of the computer system logs;

canonicalizing the plain English translation of the log file by the cyber security purpose-based large language model to standardize disparate log data into a unified format and enhance interoperability of the log data across multiple system environments, including removing log-specific variable content such as IP addresses, geographical locations, ports, and protocols to distill the log data into a quintessential log signature;

generating a multi-dimensional vector from the plain English translation of the log file by the cyber security purpose-based large language model using a paragraph embedding model wherein the paragraph embedding model generates a fixed-length vector representation that abstracts away tool-specific formatting differences to encapsulate the log data in an optimally efficient numerical representation;

applying a cosine similarity calculation to the multi-dimensional vector;

generating a multi-dimensional natural language alert signature from the multi-dimensional vector to enable identification of log entries that bear similarities irrespective of an originating tool vendor;

storing the multi-dimensional natural language alert signature in a vector index database;

applying a machine learning algorithm to the multi-dimensional natural language alert signature in the vector index database wherein the machine learning algorithm comprises Generative Artificial Intelligence models for intelligently predicting security events for preemptive cyber defense mechanisms;

associating the multi-dimensional natural language alert signature with the log file;

finger-printing the multi-dimensional natural language alert signature with the log file to generate a finger print;

associating the multi-dimensional natural language alert signature with the plain English translation;

matching the finger print to another log file to substantially condense log information thereby achieving a reduction in storage requirements and facilitating an extension in log retention durations; and including a prompt with the transmitting of the log file to the cyber security purpose-based large language model.

2. The method for canonicalizing computer system logs into natural language processed representations for data analysis of claim 1, the method further comprising:

originating the received log file from a variegated assortment of tools.

3. The method for canonicalizing computer system logs into natural language processed representations for data analysis of claim 1, the method further comprising:

preserving the received log file by storing it within a database, ensuring its availability for future reference.

4. The method for canonicalizing computer system logs into natural language processed representations for data analysis of claim 1, the method further comprising:

treating the received log file as a contiguous string of text.

5. The method for canonicalizing computer system logs into natural language processed representations for data analysis of claim 4, the method further comprising:

subjecting the contiguous string of text to an embedding model.

6. The method for canonicalizing computer system logs into natural language processed representations for data analysis of claim 5, the method further comprising:

tokenizing the contiguous string of text.

7. The method for canonicalizing computer system logs into natural language processed representations for data analysis of claim 6, the method further comprising:

vectorizing the contiguous string of text into vector form.

8. The method for canonicalizing computer system logs into natural language processed representations for data analysis of claim 1, the method further comprising:

including a second prompt with the transmitting of a second log file to a cyber security purpose-based large language model.

9. The method for canonicalizing computer system logs into natural language processed representations for data analysis of claim 1, the method further comprising:

designing the prompt to guide the cyber security purpose-based large language model in its interaction with the log file.

10. The method for canonicalizing computer system logs into natural language processed representations for data analysis of claim 9, the method further comprising:

designing the prompt as a template.

11. The method for canonicalizing computer system logs into natural language processed representations for data analysis of claim 10, the method further comprising:

designing the prompt as the template including information pertaining to: a tool, a tool name, an event id, an event name, a detected date, a source IP address, a source TCP port, a destination IP address, a destination TCP port, a protocol used, a source IP address location, and a destination IP address location.

12. The method for canonicalizing computer system logs into natural language processed representations for data analysis of claim 11, the method further comprising:

responding by the cyber security purpose-based large language model with information including an identity of the tool, the event id, a detected event, a time of detection, the source IP address, the destination TCP port, the protocol used, a geographic location of the source IP address and a geographic location of the destination IP address.

13. A system for canonicalizing computer system logs into natural language processed representations for data analysis to solve a technical problem of requiring specialized parsers for heterogeneous log formats from different cybersecurity tools, the system comprising:

a processor;

a memory including instructions for:

a real-time data collector to receive log files from cybersecurity tools including firewalls endpoint detection and response systems, cloud security platforms, security information and event management systems, and intrusion detection frameworks;

a cyber security purpose-based large language model communicatively coupled to the real-time data collector to overcome a heterogeneous nature of the computer system logs emanating from disparate sources and tools and obviate a necessity for specialized tool-specific integrations, wherein the cyber security purpose-based large language model generates standardized format responses irrespective of diversity in tool vendors or inherent content of the computer system logs;

the cyber security purpose-based large language model to remove log-specific variable content such as IP addresses, geographical locations, ports, and protocols to distill data into quintessential log signatures;

the cyber security purpose-based large language model to generate multi-dimensional vectors using a paragraph embedding model to encapsulate logs in optimally efficient numerical representations;

a multi-dimensional vector generator communicatively coupled to the cyber security purpose-based language model and a vectorization index;

a prediction engine communicatively coupled to the multi-dimensional vector generator comprising Generative Artificial Intelligence models for intelligently predicting security events for preemptive cyber defense mechanisms; and the vectorization index configured to receive a multi-dimensional vector and facilitate substantial condensation of log information thereby achieving reduction in storage requirements and extension in log retention durations.

14. The system for canonicalizing computer system logs into natural language processed representations for data analysis of claim 13, the system further comprising:

the real-time data collector to receive a log file from a variegated assortment of tools.

15. The system for canonicalizing computer system logs into natural language processed representations for data analysis of claim 14, the system further comprising:

the cyber security purpose-based large language model to receive the log file.

16. The system for canonicalizing computer system logs into natural language processed representations for data analysis of claim 15, the system further comprising:

the cyber security purpose-based large language model to apply natural language processing to the log file.

17. The system for canonicalizing computer system logs into natural language processed representations for data analysis of claim 16, the system further comprising:

the cyber security purpose-based large language model to generate a plain English translation of the log file.

18. The system for canonicalizing computer system logs into natural language processed representations for data analysis of claim 17, the system further comprising:

the cyber security purpose-based large language model to canonicalize the plain English translation of the log file.

19. The system for canonicalizing computer system logs into natural language processed representations for data analysis of claim 18, the system further comprising:

the cyber security purpose-based large language model to generate a multi-dimensional vector from the plain English translation of the log file.

20. The system for canonicalizing computer system logs into natural language processed representations for data analysis of claim 13, the system further comprising:

a second vectorization index configured to receive a second multi-dimensional vector.

\* \* \* \* \*